Sept. 30, 1952 J. R. ANDERSON ET AL 2,612,566

MAGNETIC RECORDING AND REPRODUCING SYSTEM

Filed June 5, 1951 2 SHEETS—SHEET 1

INVENTORS J. R. ANDERSON
A. C. KELLER
BY
J. F. McEneany
ATTORNEY

Sept. 30, 1952 J. R. ANDERSON ET AL 2,612,566

MAGNETIC RECORDING AND REPRODUCING SYSTEM

Filed June 5, 1951 2 SHEETS—SHEET 2

INVENTORS J. R. ANDERSON
A. C. KELLER
BY
J. F. McEneany
ATTORNEY

Patented Sept. 30, 1952 2,612,566

UNITED STATES PATENT OFFICE 2,612,566

MAGNETIC RECORDING AND REPRODUCING SYSTEM

John R. Anderson, Berkeley Heights, N. J., and Arthur C. Keller, Bronxville, N. Y., assignors to Bell Telephone Laboratories, Incorporated, New York, N. Y., a corporation of New York Application June 5, 1951, Serial No. 229,974

7 Claims. (Cl. 179—100.2)

This invention relates to magnetic tape recording and reproducing systems and particularly to improvements in means for positioning the movable record receiving element with respect to the fixed recording element during operation.

It is the object of this invention to provide a magnetic tape recording and reproducing system in which a predetermined clearance between the moving tape and the fixed recording or reproducing element may be accurately maintained during operation.

A feature of the invention resides in the provision of one or a plurality of expanding low pressure air streams directed toward the magnetic tape in the region of sound translation substantially at right angles to the direction of movement of the tape.

In existing magnetic tape recording and reproducing apparatus, the magnetic tape is usually in contact with the magnetic head and with elements provided for guiding the tape from the feed reel to the take-up reel. This frictional contact between the movable element and the fixed elements results in wear of the tape and of the pole tip surface of the magnetic head. Such wear over a relatively short period of time results in a reduction of the operating efficiency of the magnetic head and of the usable life of the magnetic tape.

It is desirable to maintain a very small clearance of constant magnitude between the magnetic recording and reproducing heads and the recording surface such as tapes or drums when the latter are moving at high lineal velocities. Consideration has been given heretofore to a mechanical design by means of which such clearance can be accurately maintained. In order to avoid eccentricities which would produce variations in the desired clearance, it was found that the mechanical elements provided to transport the tape in such a machine would have to be made with such extremely high precision that the cost would be prohibitive and in addition there would be no definite assurance of continued accuracy of operation.

In accordance with this invention, the clearance between a flexible tape and a recording head at the sound translation point is maintained accurately with recording and reproducing apparatus employing present standard tape transporting elements by means of one or a plurality of expanding low pressure air streams directed to the surface of the moving tape approximately at right angles to the direction of movement thereof and directly at or adjacent the point of sound translation.

Further, in accordance with this invention, the magnetic tape may be transported from feed reel to take-up reel past the sound translation means and around necessary path-defining guides free from frictional contact with the surfaces of such elements by the use of expanding low pressure air streams at each of said points.

The invention will be more clearly understood by reference to the accompanying drawings in which.

Figure 1:
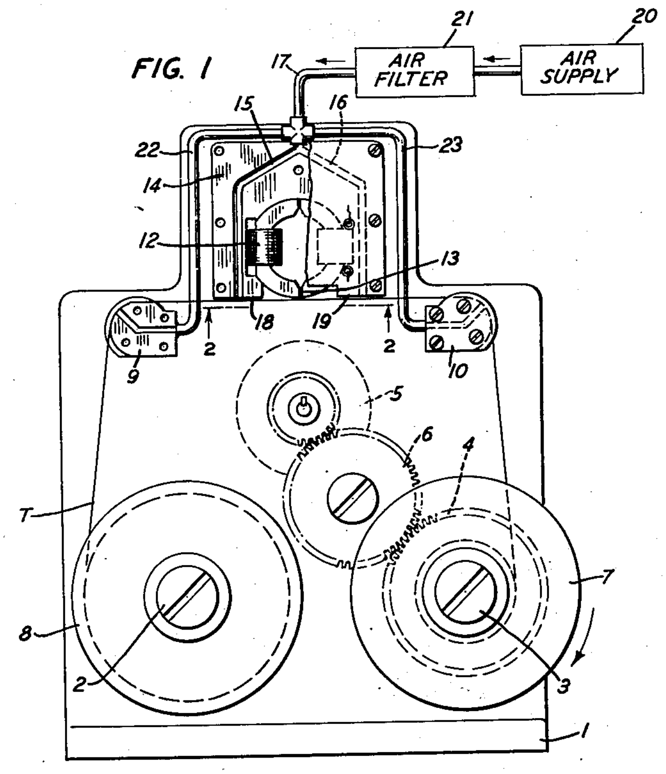
Fig. 1 is a front elevation of a magnetic tape recorder and reproducer constructed in accordance with this invention.

Referring to Fig. 1, a supporting base 1 is provided with studs 2 and 3. These studs are rotatably mounted in base 1 and the stud 3 has a gear 4 attached thereto. The stud 3 may be positively rotated by a motor 5 and a gear 6, which is in mesh with gear 4. A take-up reel 7 is removably mounted on stud 3. In rotating with stud 3, the reel 7 draws a magnetic tape T from a feed reel 8.

Magnetic sound recording on and reproduction from tape T takes place on the tape between fixed guides 9 and 10. A means provided for this purpose comprises a magnetic head, generally indicated at 12. This magnetic head comprises a core having pole-pieces which converge to form an air-gap 13 facing the tape T. This magnetic head is mounted in a supporting member 14, which is secured to base 1. Member 14 is provided with a pair of conduits 15 and 16, both of which are connected to an air supply conduit 17. The conduits 15 and 16 terminate at the bottom surfaces 18 and 19, respectively, of the member 14. As will be seen from Fig. 1 and Fig. 2, the surfaces 18 and 19 extend equal distances outwardly from the terminating ends of conduits 15 and 16 to form a flange surface facing the film. These flange surfaces produce radial expansion of the air at the surface of the tape as shown by arrows in Fig. 2.

Air under pressure supplied from a source 20 is filtered at 21 and enters through conduit 17 to branch conduits 15 and 16. Additional air conduits 22 and 23 carry the air under pressure to the center of each of the fixed guide members 9 and 10. The curved surface of each guide facing the tape forms a flange member producing expansion of the air at the tape surface.

Figure 2:
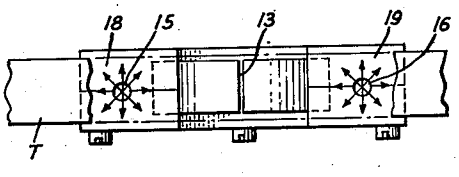
Fig. 2 is a view taken through line 2—2 of Fig. 1 showing the points of application and the expansion pattern of the fluid stream.

In the system shown in Figs. 1 and 2, the tape T is maintained in a stable position resulting from the expansion of the air at the flange surface. The impact of the air moving against the tape tends to move the tape away from the flange surface against the tension in the tape set up therein by the tape-moving mechanism. However, the increasing cross-section of the air path as the air moves radially outward along the flange surface produces an area of less than atmospheric pressure which tends to keep the tape near the flange surface. In the machine shown in Figs. 1 and 2, the magnetic head is mounted in the supporting member 14 such that the lower face of the pole-pieces is exactly located in the plane including the flange surfaces. Thus, under the action of the air streams at the flange surface the tape is maintained clear of the pole-pieces at the air-gap by a distance predetermined by the particular design, to thereby eliminate wear which would normally be caused by friction between these elements.

In the system as shown, the forces which may be realized with the recording tape of the order of one-half inch wide, assuming an air inlet diameter of approximately one-eighth inch, are of the order of 50 to 100 grams for air pressures ranging from 5 to 10 pounds per square inch. Clearance developed between the fixed element and the moving tape under the conditions recited is relatively independent of the air pressure and this clearance will be in the order of 1 or 2 mils. The exact clearance desired may be predetermined by proper design and the clearance obtained by such design will be accurately maintained at all times during operation.

Figures 3, 4:
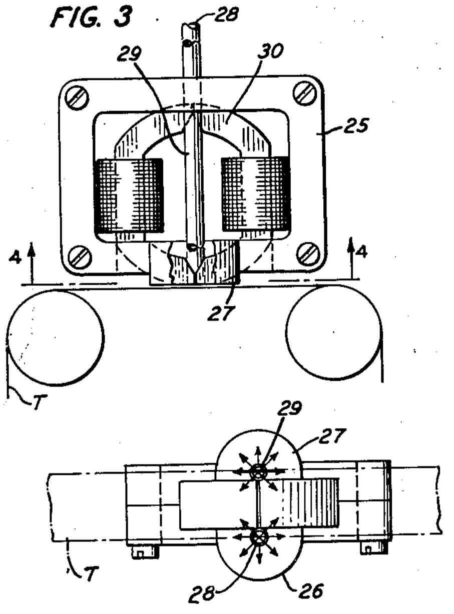
Fig. 3 is an enlarged view of another magnetic head with a different arrangement for applying a fluid stream to the magnetic tape.
Fig. 4 is a view taken through line 4—4 of Fig. 3.

In the arrangement shown in Figs. 3 and 4, a pair of conduits direct a fluid stream at transversely spaced portions of the tape adjacent the gap formed by the magnetic head pole-pieces. A fixed supporting member 25 is provided with laterally extending flange members 26 and 27. Conduits 28 and 29 terminate at the lower surface of these flange members to direct a fluid stream at the surface of the tape at opposite ends of the air-gap formed by the pole-pieces of the magnetic head 30.

Figure 5:
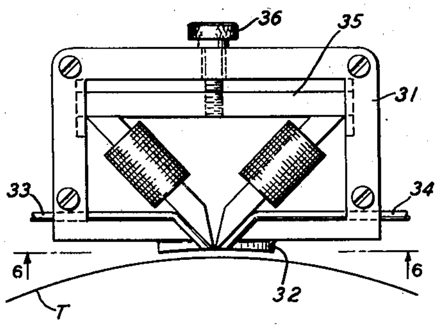
Fig. 5 is a view of a magnetic head supporting member with means for adjustably mounting a magnetic head therein.
Figure 6:
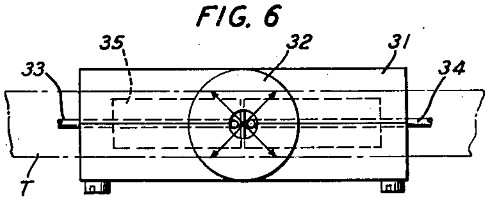
Fig. 6 is a view taken through line 6—6 of Fig. 5.

In the arrangement shown in Figs. 5 and 6, the fixed supporting member 31 is provided with centrally apertured circular flange member 32 facing the recording surface of the tape T. Conduits 33 and 34 each directs a fluid stream at the surface of the tape through the aperture in flange 32. Means are provided for mounting the magnetic head 35 for adjustment toward and away from the tape T. A knurled adjusting screw 36 extending through the support 31 engages magnetic head 35 to raise or lower this head relative to the surface of the flange member 32. An arrangement such as that shown eliminates the necessity for extreme accuracy in mounting the magnetic head with the pole tips exactly in the plane including the flange surface. After the desired clearance between flange surface and tape is obtained, the magnetic head may be adjusted to the desired separation from the tape.

Figure 7:
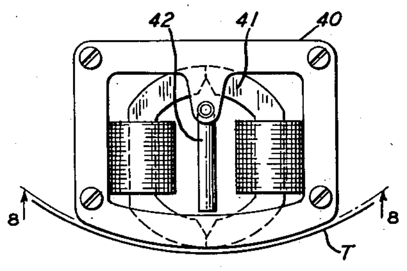
Fig. 7 is a view of a magnetic head in accordance with this invention in which the fluid stream is directed at the film through the gap between the pole-pieces of the magnetic head.
Figure 8:
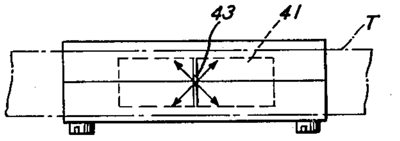
Fig. 8 is a view taken through line 8—8 of Fig. 7.

The arrangement shown in Figs. 7 and 8 can be used to advantage with a magnetic erase head which is often incorporated into a magnetic recording and reproducing apparatus. An erase head is usually operated with larger currents than are applied to a record and reproduce head and, therefore, the erase head may operate at higher temperatures. The use of the arrangement as shown in Figs. 7 and 8 provides a means for cooling the pole tips as well as maintaining the desired clearance between the pole tips and the recording surface of the tape. The supporting member 40 has a magnetic head 41 mounted therein and the fluid-carrying conduit directs a fluid stream at the surface of the tape T through the air-gap 43 formed by the pole-pieces of the magnetic head 41.

Figure 9:
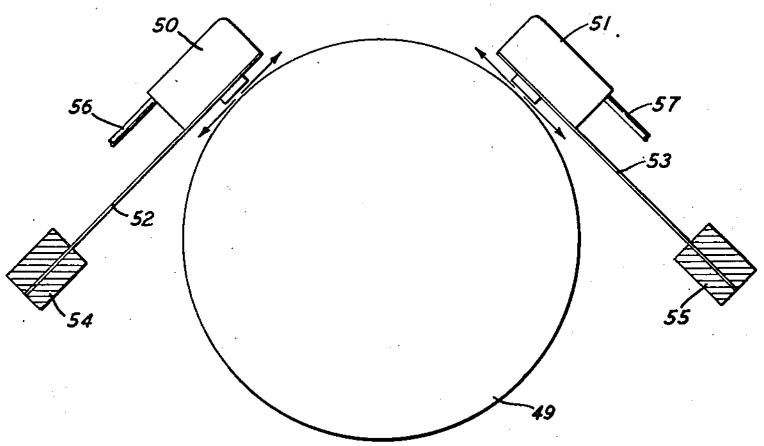
Fig. 9 is a showing of the application of invention to a recording or reproducing system in which the tape is mounted on a drum or in which the drum is coated with a ferromagnetic metal alloy or dispersed iron powder magnetic recording medium.

Fig. 9 disclosed the application of the invention to systems in which individual recording or reproducing tapes are mounted on a cylinder 49 rotating at high speed and in which one or a plurality of magnetic heads 50 and 51 record on or reproduce from the tape or tapes individually. To maintain the proper clearance, each of the record heads 50 and 51 are mounted on one end of a flat spring 52 and 53, respectively, the other end of each spring is anchored to a fixed support as shown in 54 and 55. By the application of a fluid stream to the magnetic heads through conduits 56 and 57, each of the heads 50 and 51 will position itself from the surface of its associated tape independently of each other.

By means of the invention as disclosed in the several arrangements of the figures of the drawing, friction and wear between the moving tape and the magnetic head and between the tape and path-defining guides are eliminated. Therefore, the useful life of the magnetic head and of the tape will be indefinitely prolonged.

What is claimed is:

1. In a magnetic recording and reproducing system, a magnetic head, a magnetic record member cooperating therewith, said head comprising a core having pole-pieces which converge to form a gap facing said record member, means for maintaining a fixed spacing between said record member and said core comprising a fluid conduit in said head, said conduit terminating in a flange member positioned between said record member and said core at said gap, and means for producing a flow of fluid between said flange and said record member.

2. In a magnetic recording and reproducing system, a magnetic head comprising a core having pole-pieces which converge to form an air-gap, a record-carrying tape, means moving said tape in the direction of its longer dimension past the air-gap formed in said head, and means for maintaining a predetermined clearance between said head and said tape in the area of sound translation, said last-mentioned means comprising a fluid-carrying conduit positioned to direct a fluid stream against the recording surface of said tape adjacent the point of sound translation, said conduit terminating in a flange member producing radial expansion of said fluid stream at the surface of said tape.

3. A magnetic recording and reproducing system in accordance with claim 2, in which a plurality of fluid-carrying conduits, each with its associated flange member, are positoned to direct a fluid stream on said tape at spaced points located substantially equal distances on opposite sides of said magnetic head.

4. A magnetic recording and reproducing system in accordance with claim 2 in which the flange member is shaped to correspond to the curvature of the path defined by said tape member at the point of juxtapositon of the two said members.

5. In a magnetic recording and reproducing system, a magnetic head comprising a core having pole-pieces which converge to form a gap, a record-carrying tape, means moving said tape in the direction of its longer dimension past the gap in said head, and means for maintaining a predetermined clearance between said head and said tape in the area of sound translation, said last-mentioned means comprising a fluid-carrying conduit positioned to direct a fluid stream toward the recording surface of said tape through the gap formed by the pole-pieces of said magnetic head, the exterior surfaces of said pole-pieces forming a flange member producing expansion of said fluid stream at the surface of said tape.

6. In a magnetic recording and reproducing system, a record-carrying tape, means moving said tape in the direction of its longer axis, a supporting element disposed along the path of travel of said tape, said supporting member being provided with a centrally apertured flange portion adjacent said tape, a fluid-carrying conduit carried by said supporting member and terminating at the aperture therein, a magnetic head comprising a core having pole-pieces which converge to form a gap, means adjustably mounting said head in said supporting member with the pole-pieces thereof centrally disposed in the aperture in said supporting member, and means for adjusting said head in said supporting member to vary the distance between said pole-pieces and said tape.

7. In a magnetic record and reproducing system, a magnetic tape, feed and take-up reels for said tape, means for moving said tape from said feed reel to said take-up reel, stationary guide means defining the path of said tape between said reels, a magnetic head comprising a core having pole-pieces which converge to form a gap, said head disposed with the gap in its pole-pieces adjacent the recording surface of said tape and means producing a friction-free path for said tape between said reels comprising a conduit containing air under pressure, said conduit terminating in a flange member facing the recording surface of said tape adjacent said magnetic head, and a further air-filled conduit terminating at the tape-engaging surface of said stationary guide to direct an expanding air stream against the surface of said tape facing said guide.

JOHN R. ANDERSON.
ARTHUR C. KELLER.

No references cited.